United States Patent
Vanhee et al.

(10) Patent No.: US 11,515,756 B2
(45) Date of Patent: Nov. 29, 2022

(54) ELECTRIC MOTOR COOLING SYSTEM (71) Applicant: Dana Belgium N.V., Bruges (BE)

(72) Inventors: Steven Vanhee, Staden (BE); Maximilian Hombsch, Begijnendijk (BE)

(73) Assignee: Dana Belgium N.V., Bruges (BE)

( * ) Notice: Subject to any disclaimer, the term of this patent is extended or adjusted under 35 U.S.C. 154(b) by 302 days.

(21) Appl. No.: 16/833,385

(22) Filed: Mar. 27, 2020

(65) Prior Publication Data
US 2021/0305883 A1    Sep. 30, 2021

(51) Int. Cl.
*H02K 9/19* (2006.01)
*H02K 1/27* (2022.01)
*H02K 21/14* (2006.01)
*H02K 1/2706* (2022.01)
*H02K 17/16* (2006.01)

(52) U.S. Cl.
CPC ............ *H02K 9/19* (2013.01); *H02K 1/2706* (2013.01); *H02K 17/165* (2013.01); *H02K 21/14* (2013.01)

(58) Field of Classification Search
CPC ...... H02K 9/19; H02K 1/2706; H02K 17/165; H02K 21/14; H02K 1/276; H02K 1/32; H02K 9/20; H02K 5/1732; H02K 11/21; H02K 11/25; H02K 2213/03; H02K 1/278

See application file for complete search history.

(56) References Cited

U.S. PATENT DOCUMENTS

| | | | |
|---|---|---|---|
| 2005/0061486 A1 | 3/2005 | Kang | |
| 2009/0139781 A1 | 6/2009 | Straubel | |
| 2011/0089777 A1* | 4/2011 | Rivera | H02K 1/32 310/68 B |
| 2011/0309695 A1 | 12/2011 | Huard | |
| 2014/0368064 A1* | 12/2014 | Fedoseyev | H02K 9/20 310/54 |
| 2015/0326085 A1 | 11/2015 | Lee | |
| 2016/0043613 A1* | 2/2016 | Patel | H02K 9/22 310/52 |
| 2016/0261158 A1* | 9/2016 | Horii | H02K 1/274 |
| 2017/0207682 A1 | 7/2017 | Rollins et al. | |
| 2018/0041105 A1* | 2/2018 | Bauer | H02K 3/24 |
| 2019/0036438 A1* | 1/2019 | Murase | H02K 9/19 |

FOREIGN PATENT DOCUMENTS

| | | | | |
|---|---|---|---|---|
| JP | 5367258 B2 | 12/2013 | | |
| WO | WO-2018082973 A1 * | 5/2018 | ............... | H02K 1/32 |

* cited by examiner

*Primary Examiner* — Thomas Truong
(74) *Attorney, Agent, or Firm* — McCoy Russell LLP (57) ABSTRACT

Methods and systems for cooling an electric motor are provided. An electric motor cooling system, in one example, includes a stator at least partially surrounding a rotor and an inner passage extending axially through the rotor and including an inlet and an outlet. The cooling system further includes an outer passage including an inlet in fluidic communication with the outlet of the inner passage and an outlet in fluidic communication with an inlet of the inner passage and a phase change material in the inner passage and the outer passage.

20 Claims, 6 Drawing Sheets

ELECTRIC MOTOR COOLING SYSTEM

FIELD

The present disclosure relates to cooling systems for electric motors.

BACKGROUND

A motor's thermodynamic characteristics affect its performance. Cooling jackets (e.g., water or oil cooling jackets) adjacent to a stator are used in certain motors to remove heat from the stator and surrounding components. These type of cooling systems commonly use actively controlled components such as pumps and valves to circulate coolant near the motor's stator. However, these types of actively controlled components increase cooling system complexity and cost. Furthermore, control strategies are also needed for active cooling systems, further increasing cooling system development costs. Increasing electric motor power output and compactness may further exacerbate motor cooling issues. Furthermore, the active cooling system may not sufficiently cool the motor's rotor, in certain motor designs. Motor performance and efficiency may be decreased as a result of the insufficient motor cooling.

SUMMARY

To overcome at least some of the aforementioned drawbacks an electric motor cooling system is provided. The electric motor cooling system, in one example, includes a stator at least partially surrounding a rotor. The cooling system further includes an inner passage extending axially through the rotor and including an inlet and an outlet. The cooling system further includes an outer passage having an inlet in fluidic communication with the outlet of the inner passage and an outlet in fluidic communication with an inlet of the inner passage. The cooling system also includes a phase change material in the inner passage and the outer passage. In this way, a phase change material in the rotor is used to passively and efficiently cool the rotor in a compact arrangement. Motor efficiency and performance may be consequently increased.

In another example, the phase change material may be configured to, when in a liquid state, convectively circulate through the inner and outer passages. In this way, greater rotor cooling can be achieved, further increasing motor efficiency and performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric motor cooling system designed to increase the amount of heat removed from a rotor is described herein. The motor cooling system includes passages with phase change material traversing the rotor and designed to circulate the phase change material therethrough, during certain operating conditions. In this way, the phase change material passively cools the rotor which in turn increases motor efficiency. The phase change material may be a solid-liquid type material, absorbing heat and holding a desired temperature as long as it is transitioning from solid to liquid state. It may also be a liquid-gas phase change material, increasing heat transfer in the boiling regime and changing its density in the transition, which may have a desired effect of propelling convective motion of the fluid, in some examples. Specifically, in one example, the passages may be integrated into metal tubes in a squirrel cage arrangement in the rotor. This arrangement results in a more space efficient cooling system. In another example, the phase change material passages may be adjacent to permanent magnets in the rotor, enabling the magnets to be strategically cooled by a greater extent than other rotor sections. In yet another example, the phase change material may be included in heat tubes designed to circulate the material through squirrel cage shafts. The aforementioned motor cooling system designs increase the amount of heat extracted from the rotor during operation through a relatively low cost and space efficient arrangement, in comparison to more active cooling systems including pumps, valves, etc., for instance. Motor performance and efficiency may result from the rotor cooling.

Figure 1:
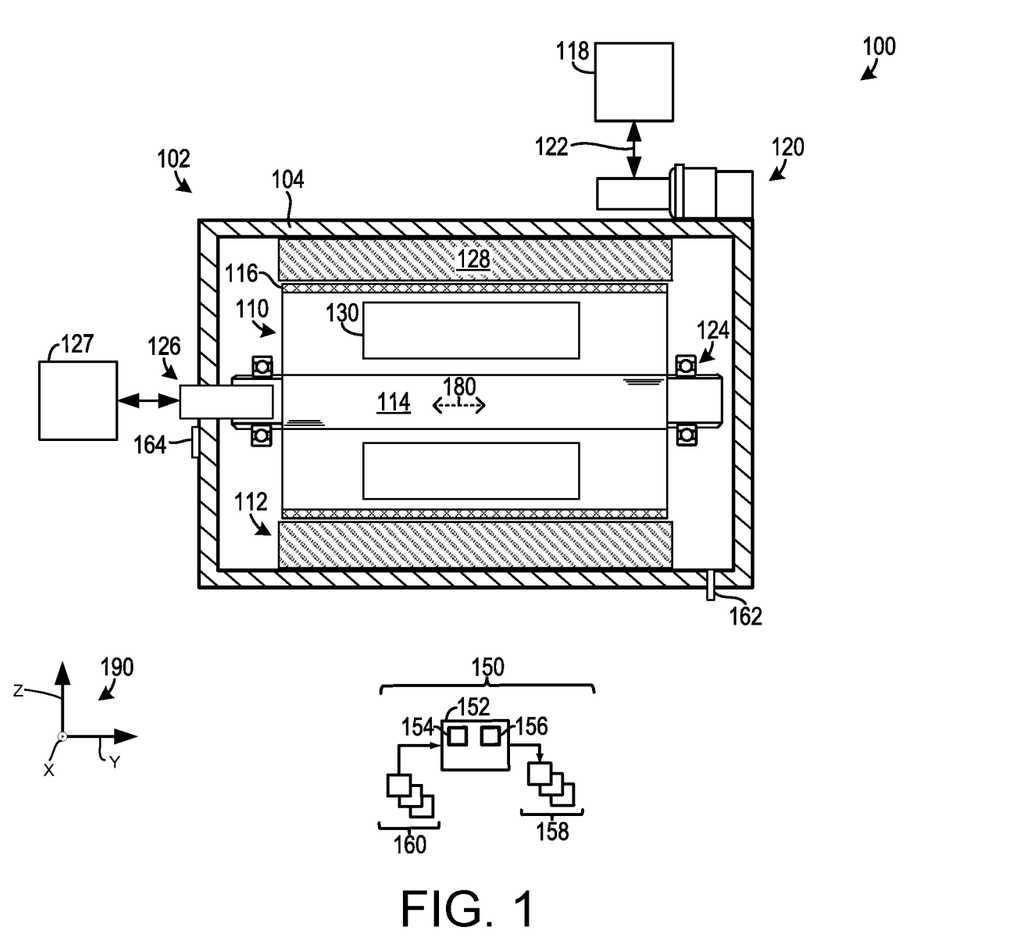
FIG. 1 illustrates an electric motor.

FIG. 1 shows a high-level depiction of an electric motor and motor cooling system. FIGS. 2-9 depict different embodiments of electric motor cooling systems designed to transfer heat away from a rotor via a phase change material. FIG. 10 shows a method used in a cooling system to passively circulate a phase change material through the rotor.

FIG. 1 illustrates an electric motor 100 which may be deployed in variety of operating environments including: automotive applications (e.g., light, medium, and heavy duty vehicles), industrial settings, agricultural equipment, etc. For instance, in one use-case scenario, the electric motor 100 may be integrated in a hybrid vehicle or battery electric vehicle (BEV).

A variety of suitable electric motor configurations may be used depending on the end-use design goals. For instance, the motor may be an alternating current (AC) motor. AC motor types include asynchronous (e.g., squirrel cage and wound rotor) and synchronous style motors. Synchronous motors such as one and three phase, may be used in certain embodiments. The styles of three phase motors that may be deployed include permanent magnet, synchronous reluctance, hybrid synchronous (e.g., permanent magnet assisted synchronous reluctance), synchronous induction, and hysteresis. In one use-case scenario, a squirrel cage asynchronous motor may be used due to its relatively low cost, low maintenance, and high efficiency. Continuing with the AC motor use-case, a synchronous permanent magnet motor may be utilized, in other instances, due to its relatively high conversion efficiency.

Regardless of the specific type of electric motor used, the electric motor 100 includes a housing 102 with a wall 104 enclosing interior components such as a rotor 110 and a stator 112. To elaborate, the motor 100 is illustrated in FIG. 1 as an internal rotor motor where the stator at least partially surrounds the rotor.

The rotor 110 includes a rotor shaft 114 and a magnetically interactive portion 116 designed to electromagnetically interact with the stator 112 to generate torque in an output mode or generate electrical energy in the stator in a regenerative mode, in some examples. Thus, the motor 100 may be designed to generate output torque using electrical energy from an energy source 118 (e.g., energy storage device such as a battery, capacitor, etc.). The electric motor 100 includes an electrical interface 120 embodied as a bus bar. However, numerous suitable electrical interfaces have been contemplated such as cables, electrical ports, combinations thereof, etc. It will be appreciated that electrical energy may be transferred between the energy source 118 and the electrical interface 120. This energy transfer is indicated via arrow 122.

The magnetically interactive portion 116 of the rotor 110 may include permanent magnetic material, in one example. However, in other examples, the magnetically interactive portion 116 may be configured as an electromagnet. In such an example, the rotor 110 may be configured to receive electrical energy (e.g., three phase current, single phase current, etc.) from the electrical interface 120. This electrical energy transfer may be carried out via wired and/or wireless energy transfer devices. Bearings 124 are shown coupled to the rotor shaft 114. The bearings are illustrated as ball bearings. However, other suitable types of bearings have been envisioned such as roller bearings, journal bearings, etc. The bearings 124 allow the rotor shaft 114 to rotate and provide radial and/or axial support thereto. The rotor shaft 114 is also shown including a rotational interface 126 designed to rotationally attach a component 127 designed to receive rotational input from the motor and, in some cases, impart torque to the motor for regeneration. For example, in the vehicle use-case example the rotational interface 126 may be coupled to a shaft in a gearbox. However, as previously discussed, the motor may be deployed in a variety of operating environments.

A cooling system 130, schematically depicted in FIG. 1, is provided in the rotor 110. The cooling system 130 may be a passive cooling system using a phase change material to absorb rotor heat and transfer the thermal energy away from the rotor. Detailed cooling system embodiments are shown in FIGS. 2-9 and are described in greater detail herein.

The motor's rotational axis 180 is provided in FIG. 1 as well as FIGS. 2-9 for reference. It will be appreciated that a radial direction is any direction perpendicular to the axis 180. An axis system 190 including an x-axis, y-axis, and z-axis is also provided in FIGS. 1-9, for reference. The z-axis may be a vertical axis, the x-axis may be a lateral axis, and/or the y-axis may be a longitudinal axis, in one example. However, the axes may have other orientations, in other examples.

The stator 112 includes a section 128 (e.g., a core). The section 128 is designed to receive electrical energy from or flow electrical energy to the electrical interface 120. For instance, wires, circuits, etc., may be used to achieve the aforementioned electrical energy transfer. The section may be constructed out of an electrically conductive material such as copper, iron, aluminum, combinations thereof, etc.

The electric motor 100 may be coupled to a control system 150 with a controller 152. The controller 152 includes a processor 154 (e.g., a microprocessor unit) and memory 156 (e.g., random access memory, read only memory, keep alive memory, etc.). The memory 156 may hold instructions stored therein that when executed by the processor cause the controller 152 to perform the various methods, control techniques, etc., described herein.

The controller 152 may be configured to send control commands to system components 158 as well as receive signals from sensors 160 and other suitable components. The controllable components may include the electric motor 100 (e.g., the motor's stator). It will be understood that the controllable components may include actuators to enable the component adjustment. The sensors may include a motor temperature sensor 162, a motor speed sensor 164, etc. As such, the controller 152 may adjust the output of the motor.

FIGS. 2-9 illustrate different cooling system embodiments for an electric motor. It will be appreciated that the cooling systems and electric motor rotors shown in FIGS. 2-9 are embodiments of the electric motor 100 and the cooling system 130, depicted in FIG. 1. As such, the structural and functional features of the electric motor 100 and the cooling system 130 described above with regard to FIG. 1 may be included in any of the motor cooling system embodiments illustrated in FIGS. 2-9 or vice versa.

Figure 2:
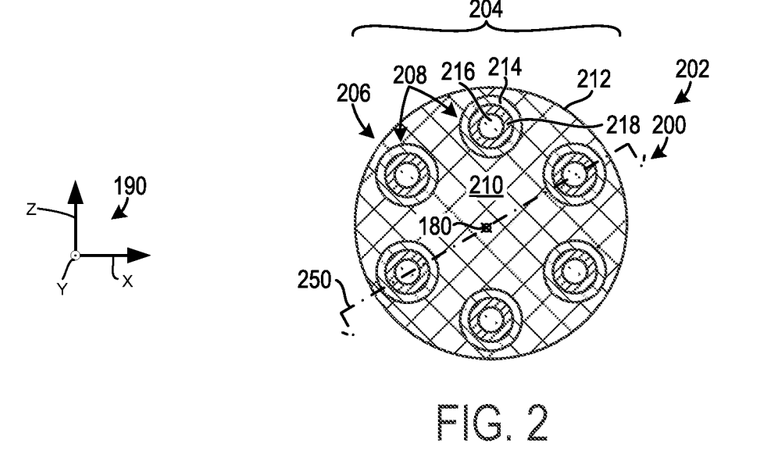
FIGS. 2 and 3 illustrate different cross-sectional views of a first example of a cooling system for an electric motor.

Turning specifically to FIG. 2 depicting a cooling system 200 in a rotor 204 of an electric motor. The rotor 204 includes a squirrel cage 206 having a plurality of tubes 208. The rotor 204 also includes a core 210. It will be understood, that a squirrel cage includes conductive shafts, embodied as tubes in FIG. 2, extending axially through the rotor. In some examples, the conductive shafts are arranged parallel to the rotor's rotational axis 180. However, in other examples, the conductive squirrel cage shafts may be slightly skewed with regard to axial alignment. Further, in certain embodiments, the squirrel cage may include end plates or rings attached to the conductive shafts and arranged at opposing axial sides of the cage. The end plates or rings may function as electrical shorts in the squirrel cage, in certain embodiments.

The rotor core 210 may be constructed out of solid or laminated magnetic steel, in one example. To elaborate, the rotor core 210 may include steel laminations, in some instances. However, other suitable core materials may be used, in other examples. Additionally, the tubes 208 are illustrated in a symmetric arrangement about the rotational axis 180. In this way, rotational imbalances in the rotor may be decreased. However, non-symmetric squirrel cage tube arrangements have been envisioned. The tubes 208 are also shown positioned adjacent to a peripheral surface 212 of the rotor 204. However, other tube arrangements have been contemplated.

The tubes 208 each include a metal housing 214 surrounding an interior. The metal housing 214 may be constructed out of copper, in one example. However, other suitable conductive metals may be used to construct the housing, such as aluminum. The end plates or rings in the squirrel cage may also be constructed out of copper or aluminum to facilitate the shorting functionality, in some embodiments.

The tubes 208 are constructed as heat pipes, in the embodiment depicted in FIG. 2. Thus, in one example, the tubes 208 may include a central core 216 filled with a fluid (e.g., a phase change material) with a wicking material 218 surrounding the central core. The wicking material may also be omitted from the heat pipes, in certain embodiments. In these embodiments, the centrifugal forces take over the role of axially distributing the liquid phase inside the central core over the tube length. However, other suitable heat pipe configurations have been envisioned. It will be understood that the heat pipes use evaporation and condensation to drive heat transfer. Thermal energy may be drawn out of the rotor as a result of the heat transfer, thereby increasing motor performance and efficiency, in some cases. Cutting plane 250 indicating the location of the cross-sectional view of FIG. 3, is also indicated in FIG. 2.

Figure 3:
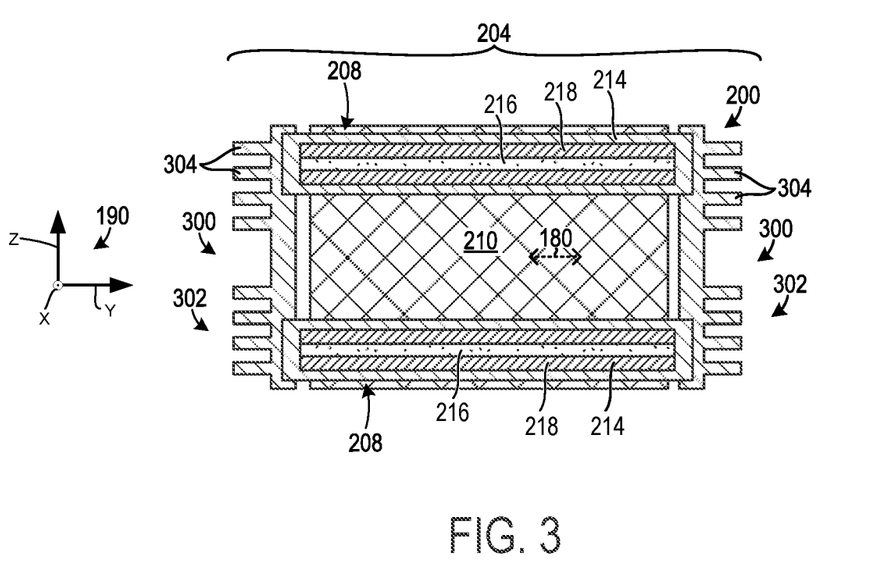

FIG. 3 shows a cross-sectional side view of the cooling system 200 and the rotor 204. The rotor 204 and rotor core 210 with the tubes 208 disposed therein are again illustrated. The tubes 208 with the central core 216 and the wicking material 218 disposed therein are also shown in FIG. 3. The central core 216 is shown axially extending across the tubes between two axial sides of the metal housing 214. However, other arrangements of the central core have been contemplated. For instance, the wicking material 218 may be positioned between the axial ends of the central core 216 and the metal housing 214, in other embodiments. Arranging the wicking material in this manner may, in some cases, increases the rate of condensation and/or evaporation in the heat pipe. However, other suitable heat pipe configurations have been envisioned. The metal housings 214 of the tubes 208 positioned in the rotor 204 are also depicted in FIG. 3.

The tubes 208 are shown extending axially between axial end plates 300 positioned on opposing axial sides 302 of the rotor 204. To elaborate, the tubes 208 may extend into the end plates 300 to increase the amount of thermal energy conducted therebetween. However, other tube-plate arrangements may be used, in other examples. The end plates 300 may include fins 304. The fins 304 are shown axially extending away from the rotor 204. However, other fin profiles have been envisioned. The fins allow a greater amount of heat to be drawn out of the rotor to the surrounding air, thereby increasing motor efficiency and performance. The end plates 300 are shown radially extending across the rotor between two of the tubes 208 in a radially opposed arrangement. However, in other examples, the end plates may have the profile of a ring circumferentially traversing a periphery of the rotor.

Figure 4:
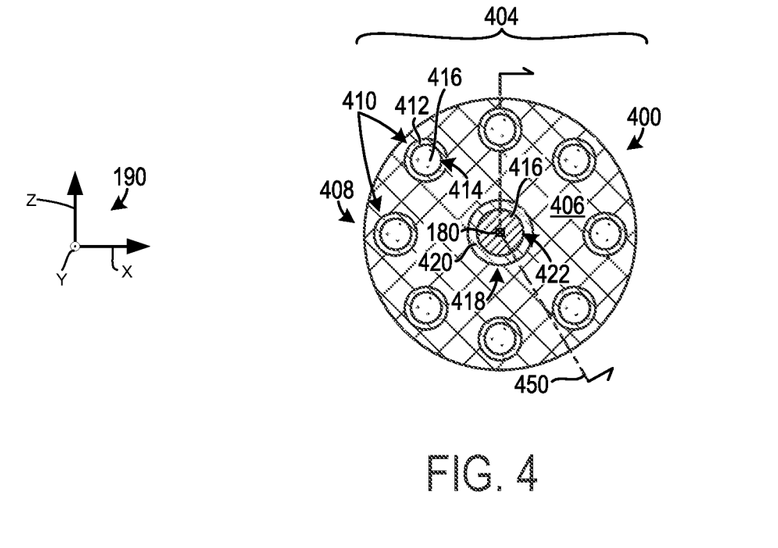
FIGS. 4 and 5 illustrate different cross-sectional views of a second example of a cooling system for an electric motor.

FIG. 4 illustrates a cooling system 400 and a rotor 404 which may be included in an electric motor. The rotor 404 again has a core 406 and a squirrel cage 408 having a plurality of outer tubes 410. The outer tubes 410 each include a metal housing 412 surrounding a passage 414, also referred to as an outer passage. The metal housing may be constructed out of copper, in one example. However, other suitable conductive metals may be used to construct the tube housing, such as aluminum.

A phase change material 416 is included in each of the outer passages 414. The type of phase change material deployed in the tubes may be selected based on the expected operating temperature range of the motor. Thus, in certain use-case examples, the phase change material, may include paraffin, gallium, sodium sulfate, sodium-potassium alloys, etc. The phase change material may therefore be in a solid, liquid, and/or vapor state depending on the temperature of the rotor. Specifically, the phase change material may be selected to transition between a liquid and a vapor state during motor operation. However, in other examples, the phase change material may be selected to transition between a solid and a liquid state during motor operation. The phase change material may be selected based on the expected operating temperature range of the motor, the material's properties (e.g., viscosity when in a liquid state, thermal conductivity, electrical conductivity contributing to the squirrel cage conductors, etc.), the expected operating environment of the motor, etc. Further in certain use-case examples, the phase change in the selected material may not occur between 0° C.-60° C. In such a use-case, the phase change material may serve as a cooling liquid and contribute to the electrical conductance of the squirrel cage even though a phase change in the material may not occur in the range of motor's operating temperature. An inner tube 418 (e.g., central tube) is also included in the cooling system 400. The inner tube 418 includes a metal housing 420 surrounding a passage 422, also referred to as an inner passage. The metal housing may be constructed out of copper, aluminum, etc. The phase change material 416 is also enclosed within the housing 420 of the inner tube 418. In one example, the inner tube 418 may be arranged coaxial to a rotational axis of the rotor. However, alternate positions of the inner tube have been contemplated.

Figure 5:
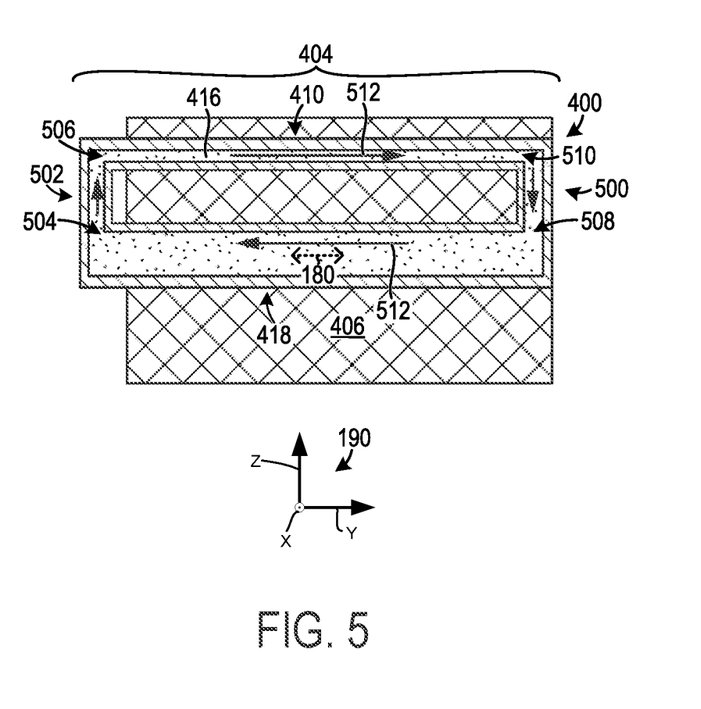

The inner tube 418 and the outer tubes 410 may be in fluidic communication via connecting passages 500 and 502, shown in FIG. 5, and described in greater detail herein. Fluidly connecting the tubes in this manner enables the phase change material to circulate through the tubes to remove heat from the rotor. The motor's efficiency and performance can be consequently increased. Cutting plane 450 indicating the location of the cross-sectional view of FIG. 5, is also indicated in FIG. 4. In other embodiments, however, a portion of the outer tubes may be in fluidic communication with the inner tube while another portion of the tube may be relatively fluidly isolated. In yet another embodiment, two or more of the outer tubes may be sequentially in fluidic communication with one another.

FIG. 5 shows a cross-sectional side view of the cooling system 400 and rotor 404. The inner tube 418 and the outer tubes 410 in the rotor 404 are again illustrated. The connecting passages 500 and 502 are also shown radially extending between the inner tube 418 and one of the outer tubes 410. However, it will be appreciated that the other outer tubes may be connected to the inner tube in a similar fashion, in certain embodiments. Furthermore, in the illustrated embodiment, the central axes of the connecting passages 500 and 502 are radially aligned. However, the connecting passages may include curved sections, in other examples.

An outlet 504 of the inner tube 418 is fluidly connected to an inlet 506 of the outer tube 410 via the connecting passage 502. Additionally, an inlet 508 of the inner tube 418 is fluidly connected to an outlet 510 of the outer tube 410 via the connecting passage 500. Additionally, the connecting passage 502 is arranged external to the rotor core 406 to allow heat to be transferred to the surrounding environment from the tubes. Conversely, the connecting passage 500 is positioned within the rotor core 406. Arrows 512 indicate the general direction of phase change material flow during convective cooling operation. As such, the phase change material 416 flows from the outer tube 410, through the connecting passage 500, through the inner tube 418, and then through the connecting passage 502. In this way, the rotor may be passively cooled. It will be understood that the phase change material may circulate through the tubes without the use of a pump, in some embodiments. If operated without pump, the fluid in the cooled connecting passage 502 will assume a higher density and build up a higher fluid pressure at the outer circumference with respect to the not cooled connecting passage 500. This causes flow from the high-pressure region to the low pressure region. In another example, the connecting passage 502 may include heat fins extending from its outer housing, to further increase rotor cooling.

Figure 6:
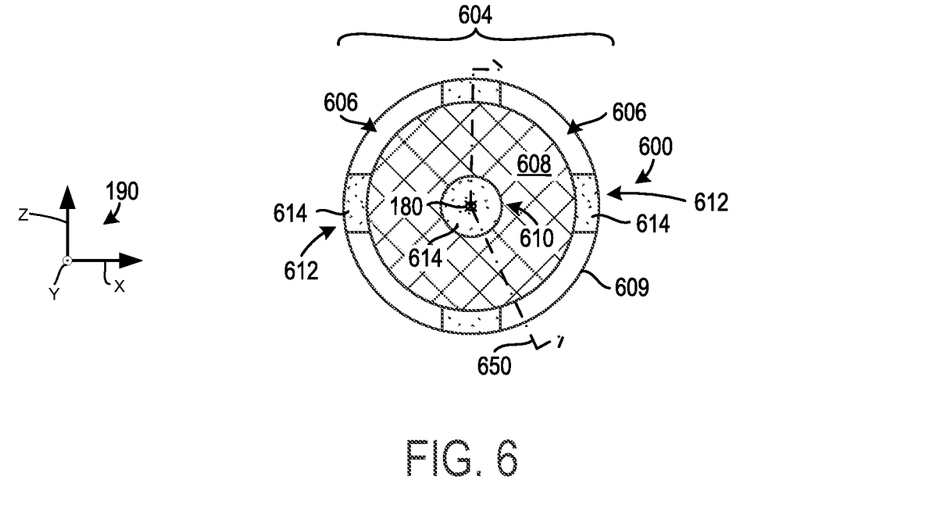
FIGS. 6 and 7 illustrate different cross-sectional views of a third example of a cooling system for an electric motor.

FIG. 6 depicts yet another cooling system 600 and a rotor 604 which may be included in an electric motor. The rotor 604 in the embodiment illustrated in FIG. 6 includes permanent magnets 606 circumferentially arranged around a core 608 of the rotor. To elaborate, the permanent magnets 606 may form a portion of the outer surface 609 of the rotor. However, in other examples, the magnets may be enclosed by the core material. The cooling system 600 includes an inner passage 610 and outer passages 612 each with a phase change material 614 enclosed therein. The phase change material may be one of the previously described materials (e.g., a liquid-vapor phase change material or a solid-liquid phase change material). Specifically, the inner and outer passages are routed through the rotor core 608. The outer passages 612 are shown arranged between the permanent magnets 606 facilitating magnet cooling. The inner passage 610 and the outer passage 612 are in fluidic communication with one another such that the phase change material 614 flows therebetween, when in a liquid phase. The outer passages 612 also have an arcuate cross-sectional profile, in the illustrated embodiment. This arcuate profile enables the outer passages to be arranged between the permanent magnets 606 and form a portion of the outer surface 609 of the rotor. However, the outer passages may have another suitable profile (e.g., circular, oval, polygonal, etc.) in other embodiments. Cutting plane 650 indicating the location of the cross-sectional view of FIG. 7, is also indicated in FIG. 6.

Figure 7:
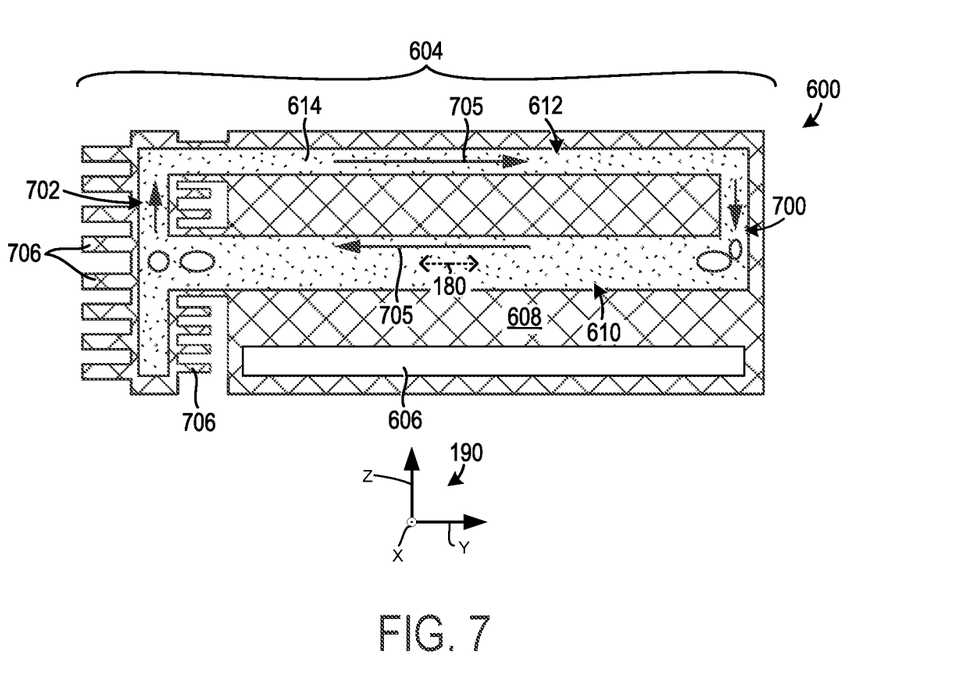

FIG. 7 shows a cross-sectional view of the cooling system 600. The inner passage 610 and the outer passages 612 in the rotor 604 are again illustrated along with the permanent magnets. Additionally, connecting passages 700 and 702 radially extending between the inner and outer passages 610 and 612 are also shown. Inlets and outlets of the connecting passages are again in fluidic communication with the inner and outer passages, enabling the phase change material 614 to be circulated in the cooling system, during certain operating conditions. The connecting passage 700 is positioned within the rotor core 608. Conversely, the connecting passage 702 is positioned external to the rotor core 608 to enable heat to be transferred from the phase change material 614 to the surrounding environment. Arrows 705 indicate the general direction of phase change material flow through the cooling system passages during convective circulation of the material.

The external connecting passage 702 includes fins 706 allowing a greater amount of heat to be transferred to the ambient environment. The fins 706 are shown extending in both axially outward and inward directions. However, in other examples, the fins may solely extend in the outward direction. It will be appreciated that a radial inward direction is parallel to the rotational axis 180 and extends toward the rotor core 608.

Figure 8:
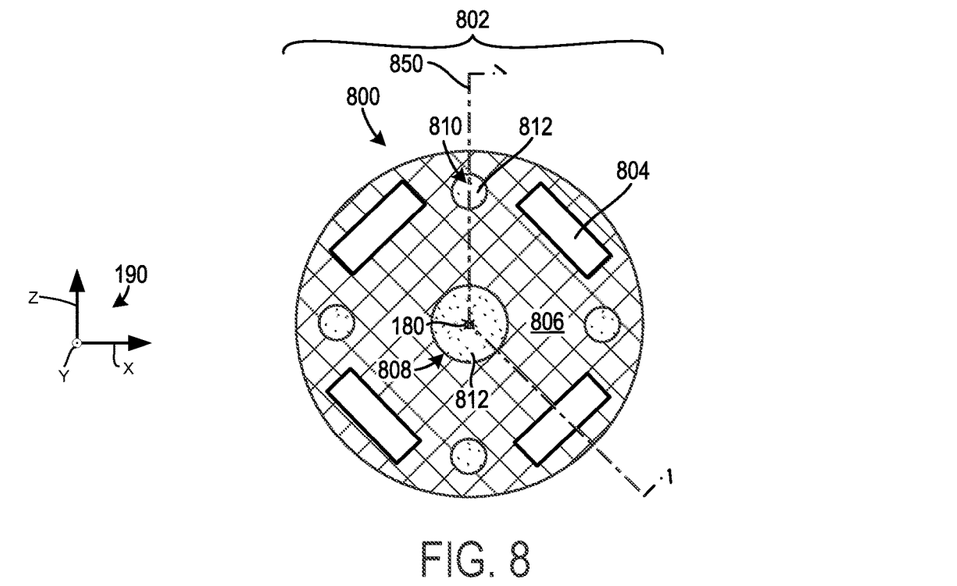
FIGS. 8 and 9 illustrate different cross-sectional views of a fourth example of a cooling system for an electric motor.
Figure 9:
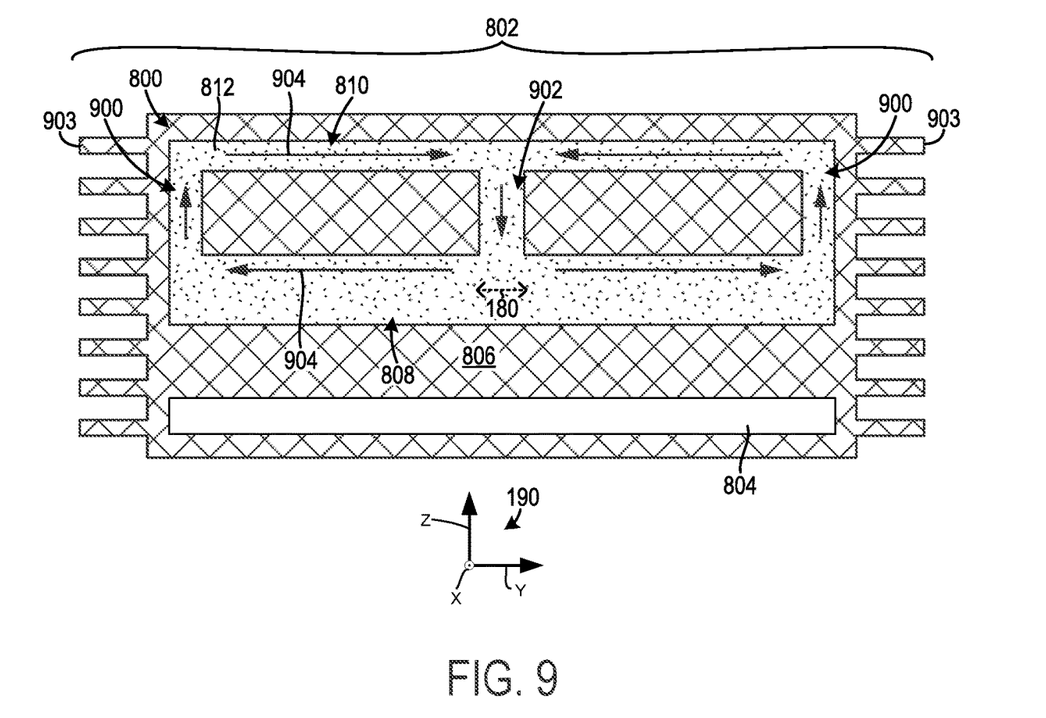
Figure 10:
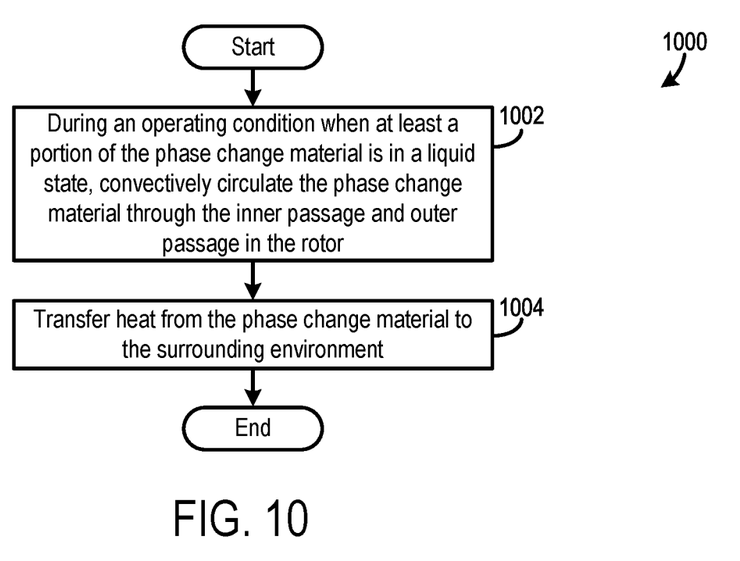
FIG. 10 illustrates a method for operation of an electric motor cooling system.

FIGS. 8-9 depict another embodiment of a cooling system 800 in a rotor 802 of an electric motor. Turning specifically to FIG. 8, the rotor 802 again includes permanent magnets 804 arranged in a core 806 of the rotor. The cooling system 800 includes an inner passage 808 and outer passages 810 each with a phase change material 812 enclosed therein. The phase change material may be one of the previously described materials (e.g., a liquid-vapor phase change material or a solid-liquid phase change material). The inner and outer passages are routed through the rotor core 806. The inner passage 808 and the outer passage 810 are designed to enable the phase change material 814 to flow therebetween. In this way, the phase change material may be circulated through the rotor core for cooling. Cutting plane 850 indicating the location of the cross-sectional view of FIG. 9, is also illustrated in FIG. 8.

The cross-sectional view in FIG. 9 again shows the rotor 802 with the permanent magnets 804 and the cooling system 800 having the inner passage 808 and the outer passage 810 with the phase change material therein 812. In the illustrated embodiment, outer connecting passages 900 and an inner connecting passage 902 provide fluidic communication between the inner passage 808 and the outer passages 810. The connecting passages therefore extend in a radial direction and the inner connecting passages is axially interposed by the outer connecting passages. However, other cooling system passage arrangements may be used, in other embodiments. Heat fins 903 extending (e.g., axially extending) from the rotor 802 may also be included in the cooling system 800. To elaborate, the fins axially extend from opposing sides of the rotor. In this way, heat can be transferred from the phase change material flowing through the outer connecting passages to the surrounding environment via heat transfer through the fins, during rotor operation. However, in other examples, the fins may extend from one axial side of the rotor or be omitted from the cooling system.

Arrows 904 indicate a general direction of flow of the phase change material 812. Thus, as illustrated, the phase change material 812 flows axially inward in the outer passage 810 and then radially inward through the inner connecting passage 902. Subsequently, the phase change material flows radially outward through the outer connecting passages 900. In this way, the phase change material circulates from outer regions of the rotor where heat is transferred to the surrounding environment by way of the fins 903 and the rotor core 806. It will be appreciated that directing the phase change material 812 through the inner connecting passage 902 allows additional heat to be removed from the rotor core when compared to other cooling systems such as the system depicted in FIGS. 6-7. Motor efficiency may be increased as a result of the additional cooling.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

FIG. 10 shows a method 1000 for operation of an electric motor cooling system. The method 1000 may be implemented by any of the electric motors and cooling systems or combinations of the electric motors and cooling systems described above with regard to FIGS. 1-9. However, in other embodiments, the method 1000 may be implemented by other suitable electric motors or cooling systems. It will be understood that at least a portion of the steps in the method may be passively implemented. Furthermore, it will be understood, that the method may be carried out during motor operation while the motor is either producing a rotational output or in a regeneration mode, in some cases. It will also be appreciated that the motor operation may be carried out via instructions stored in memory executable by a processor, as previously discussed.

At 1002, the method includes during an operating condition when at least a portion of the phase change material is in a liquid state, convectively circulating the phase change material through the inner passage and an outer passage in the rotor. Specifically, in one example, convectively circulating the phase change material through the inner passage and the outer passage, may include flowing the phase change material from the inner passage to the outer passage via radially aligned connecting passages. To elaborate, in one embodiment, the rotor may be hottest at its outer diameter. In such an embodiment, the phase change material may change from liquid to vapor in the outer tube. Since the vapor has a lower specific mass than liquid, the vapor will be pushed towards the inner tube via the cooled side of the rotor by centrifugal forces on liquid at the non-cooled side of the motor. In this way, thermal energy may be passively removed from the rotor via phase change material. It will be appreciated that the operating conditions may include a condition where rotor temperature is greater than a threshold phase change temperature of the phase change material. The threshold temperature may be in a range between 50° C. and 150° C., in one specific use-case scenario. Ranges such as 50° C. to 100° C. and 100° C. to 150° C. have specifically been contemplated. However, the phase change material and its corresponding phase change threshold temperature may be selected based on the motor's expected operating temperature, speed, material construction, etc.

Next at 1004, the method includes transferring heat from the phase change material to the surrounding environment. In this way, the heat absorbed via the phase change material may be expelled to the surrounding environment to facilitate rotor cooling.

The cooling system and passive heat removal method have the technical effect of reducing rotor temperature using a low cost and compact arrangement. Consequently, the motor's efficiency and performance can be increased using a relatively low cost and space efficient system.

The invention will be further described in the following paragraphs. In one aspect, an electric motor cooling system is provide that comprises a stator at least partially surrounding a rotor; an inner passage extending axially through the rotor and including an inlet and an outlet; an outer passage including an inlet in fluidic communication with the outlet of the inner passage and an outlet in fluidic communication with an inlet of the inner passage; and a phase change material in the inner passage and the outer passage.

In another aspect, a method for passively cooling an electric motor is provided that comprises during an operating condition when at least a portion of a phase change material is in a liquid state, convectively circulating the phase change material through an inner passage and an outer passage, each of the inner passage and the outer passage axially extending through a rotor at least partially circumferentially surrounded by a stator.

In yet another aspect, a passive electric motor cooling system is provided that comprises a stator at least partially surrounding a rotor; an inner passage extending axially through the rotor and including an inlet and an outlet; an outer passage including an inlet in fluidic communication with the outlet of the inner passage and an outlet in fluidic communication with an inlet of the inner passage; and a phase change material in the inner passage and the outer passage; wherein when at least a portion of the phase change material is a liquid, the phase change material convectively circulates through the inner passage and the outer passage.

In any of the aspect or combinations of the aspects, the phase change material may be configured to, during an operating condition when at least a portion of the phase change material is in a liquid state, convectively circulate through the inner passage and the outer passage.

In any of the aspect or combinations of the aspects, the cooling system may further comprise a first radial connecting passage extending from the outlet of the inner passage to the inlet of the outer passage and a second radial connecting passage extending from the inlet of the inner passage to the outlet of the outer passage.

In any of the aspect or combinations of the aspects, the second radial connecting passage may be positioned external to a rotor body.

In any of the aspect or combinations of the aspects, the second radial connecting passage may include a plurality of ribs extending in an axial direction.

In any of the aspect or combinations of the aspects, the inner passage and the outer passage may each be surrounded by a metal housing with the phase change material enclosed therewithin.

In any of the aspect or combinations of the aspects, the metal housing may include copper.

In any of the aspect or combinations of the aspects, the outer passage may extend between two axial end plates positioned on opposing axial sides of the rotor.

In any of the aspect or combinations of the aspects, the inner passage may be arranged coaxial to a rotational axis of the rotor.

In any of the aspect or combinations of the aspects, the peripheral passage may be adjacent to permanent magnets in the rotor.

In any of the aspect or combinations of the aspects, the electric motor may be an induction motor.

In any of the aspect or combinations of the aspects, the electric motor may be a squirrel cage induction motor.

In any of the aspect or combinations of the aspects, convectively circulating the phase change material through the inner passage and the outer passage, may include flowing the phase change material from the inner passage to the outer passage through a first radial connecting passage and from the outer passage to the inner passage through a second radial connecting passage.

In any of the aspect or combinations of the aspects, the electric motor may be an induction motor, the outer passage may be a metal tube with the phase change material therein, and the metal tube may be coupled to two axial end plates positioned on opposing axial sides of the rotor.

In any of the aspect or combinations of the aspects, the rotor may include a permanent magnet adjacent to the outer passage.

In any of the aspect or combinations of the aspects, the cooling system may further comprise a first radial connecting passage extending from the outlet of the inner passage to the inlet of the outer passage and a second radial connecting passage extending from the inlet of the inner passage to the outlet of the outer passage, wherein the second radial connecting passage is positioned external to a rotor body.

In any of the aspect or combinations of the aspects, the second radial connecting passage may include a plurality of ribs extending in a radially inward and/or outward axial direction.

In any of the aspect or combinations of the aspects, the electric motor may be a synchronous permanent magnet motor including a permanent magnet adjacent to the outer passage.

In another representation, a passive heat removal system is provided in a rotor that comprises a squirrel cage with a plurality of hollow tubes having phase change material positioned within their interiors and configured to convectively circulate through the plurality of hollow tubes, during certain operating conditions.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various electric motor and/or cooling system configurations. The control methods and routines disclosed herein may be stored as executable instructions in non-transitory memory and may be carried out by the control system including the controller in combination with the various sensors, actuators, and other system hardware. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor cooling system comprising:
a stator at least partially surrounding a rotor;
an inner passage extending axially through a core of the rotor and including an inlet and an outlet;
an outer passage including an inlet in fluidic communication with the outlet of the inner passage and an outlet in fluidic communication with an inlet of the inner passage; and
a phase change material in the inner passage and the outer passage;
wherein the inner passage and the outer passage are solely included in the core of the rotor and are designed to solely circulate the phase change material therethrough during selected operating conditions.

2. The electric motor cooling system of claim 1, wherein the phase change material is configured to, during an operating condition when at least a portion of the phase change material is in a liquid state, convectively circulate through the inner passage and the outer passage.

3. The electric motor cooling system of claim 2, further comprising a first radial connecting passage extending from the outlet of the inner passage to the inlet of the outer passage and a second radial connecting passage extending from the inlet of the inner passage to the outlet of the outer passage.

4. The electric motor cooling system of claim 3, wherein the second radial connecting passage is positioned external to a rotor body.

5. The electric motor cooling system of claim 4, wherein the second radial connecting passage includes a plurality of ribs extending in an axial direction.

6. The electric motor cooling system of claim 1, wherein the inner passage and the outer passage are each surrounded by a metal housing with the phase change material enclosed therewithin.

7. The electric motor cooling system of claim 6, wherein the metal housing includes copper.

8. The electric motor cooling system of claim 6, wherein the outer passage extends between two axial end plates positioned on opposing axial sides of the rotor.

9. The electric motor cooling system of claim 1, wherein the inner passage is arranged coaxial to a rotational axis of the rotor.

10. The electric motor cooling system of claim 1, wherein the outer passage is adjacent to permanent magnets in the rotor.

11. The electric motor cooling system of claim 1, wherein the electric motor is an induction motor.

12. The electric motor cooling system of claim 1, wherein the phase change material includes one or more of paraffin, gallium, sodium sulfate, and sodium-potassium alloy.

13. A method for passively cooling an electric motor, comprising:
during an operating condition when at least a portion of a phase change material is in a liquid state, convectively circulating the phase change material through an inner passage and an outer passage, wherein each of the inner passage and the outer passage axially extend through a core of the rotor at least partially circumferentially surrounded by a stator;
wherein the inner passage and the outer passage are solely included in the core of the rotor and are designed to solely circulate the phase change material therethrough during selected operating conditions.

14. The method of claim 13, wherein convectively circulating the phase change material through the inner passage and the outer passage includes flowing the phase change material from the inner passage to the outer passage through a first radial connecting passage and from the outer passage to the inner passage through a second radial connecting passage.

15. The method of claim 13, wherein the electric motor is an induction motor, the outer passage is a metal tube with the phase change material therein, and the metal tube is coupled to two axial end plates positioned on opposing axial sides of the rotor.

16. The method of claim 13, wherein the rotor includes a permanent magnet adjacent to the outer passage.

17. A passive electric motor cooling system comprising:
a stator at least partially surrounding a rotor;
an inner passage extending axially through a core of the rotor and including an inlet and an outlet;
an outer passage including an inlet in fluidic communication with the outlet of the inner passage and an outlet in fluidic communication with an inlet of the inner passage; and
a phase change material in the inner passage and the outer passage;
wherein, when at least a portion of the phase change material is a liquid, the phase change material convectively circulates through the inner passage and the outer passage;
wherein the inner passage and the outer passage are solely included in the core of the rotor and are designed to solely circulate the phase change material therethrough during selected operating conditions.

18. The passive electric motor cooling system of claim 17, further comprising a first radial connecting passage extending from the outlet of the inner passage to the inlet of the outer passage and a second radial connecting passage extending from the inlet of the inner passage to the outlet of the outer passage, wherein the second radial connecting passage is positioned external to a rotor body.

19. The passive electric motor cooling system of claim 18, wherein the second radial connecting passage includes a plurality of ribs extending in a radially inward and/or outward axial direction.

20. The passive electric motor cooling system of claim 17, wherein the electric motor is a synchronous permanent magnet motor including a permanent magnet adjacent to the outer passage.

* * * * *